United States Patent
Henzler et al.

(10) Patent No.: US 10,630,075 B2
(45) Date of Patent: Apr. 21, 2020

(54) MULTI-LEVEL OUTPUT CIRCUIT HAVING CENTRALIZED ESD PROTECTION

(71) Applicant: Intel IP Corporation, Santa Clara, CA (US)

(72) Inventors: Stephan Henzler, Munich (DE); Heike Schwager, Neubiberg (DE); Stephan Drueen, Munich (DE); Krzysztof Domanski, Neubiberg (DE)

(73) Assignee: Intel IP Corporation, Santa Clara, CA (US)

( * ) Notice: Subject to any disclaimer, the term of this patent is extended or adjusted under 35 U.S.C. 154(b) by 724 days.

(21) Appl. No.: 14/929,094

(22) Filed: Oct. 30, 2015

(65) Prior Publication Data

US 2017/0126003 A1     May 4, 2017

(51) Int. Cl.
| | |
|---|---|
| H02H 9/00 | (2006.01) |
| H02H 9/04 | (2006.01) |
| H02H 7/20 | (2006.01) |

(52) U.S. Cl.
CPC .............. *H02H 9/046* (2013.01); *H02H 7/20* (2013.01)

(58) Field of Classification Search
None
See application file for complete search history.

(56) References Cited

U.S. PATENT DOCUMENTS

| | | | | |
|---|---|---|---|---|
| 7,450,358 | B2 * | 11/2008 | Gossner | H01L 27/0251 361/56 |
| 7,804,290 | B2 * | 9/2010 | Henzler | G04F 10/005 324/76.82 |
| 7,855,862 | B1 * | 12/2010 | Gallagher | H01L 27/0266 361/56 |
| 8,149,046 | B2 | 4/2012 | Siprak et al. | |
| 8,451,043 | B2 | 5/2013 | Baumann et al. | |
| 8,754,793 | B2 | 6/2014 | Henzler | |
| 8,779,742 | B2 * | 7/2014 | Henzler | H02M 3/158 323/283 |
| 8,909,065 | B2 | 12/2014 | Henzler | |
| 8,994,573 | B2 | 3/2015 | Henzler et al. | |
| 9,130,588 | B2 | 9/2015 | Henzler et al. | |
| 9,356,443 | B2 * | 5/2016 | Yang | H02H 9/046 |
| 9,762,242 | B2 * | 9/2017 | Forghani-Zadeh | H03K 19/017509 |
| 2003/0016478 | A1 | 1/2003 | Liu et al. | |
| 2007/0230073 | A1 | 10/2007 | Ker et al. | |
| 2008/0049365 | A1 | 2/2008 | Worley et al. | |

(Continued)

FOREIGN PATENT DOCUMENTS

JP     2014207412 A     10/2014

OTHER PUBLICATIONS

International Search Report and Written Opinion for PCT Patent Application No. PCT/US2016/045033, dated Nov. 10, 2016, 11 pages.

*Primary Examiner* — Stephen W Jackson
(74) *Attorney, Agent, or Firm* — Compass IP Law PC

(57) ABSTRACT

An apparatus is described. The apparatus includes an electronic circuit includes multiple supply voltage nodes, an output node and an internal node. The electronic circuit also includes first protection circuitry coupled between the internal node and the output node. The electronic circuit also includes a control circuit coupled to the internal node to bias the internal node. The electronic circuit also includes second protection circuitry coupled to the internal node.

23 Claims, 7 Drawing Sheets

(56) References Cited

U.S. PATENT DOCUMENTS

| | | |
|---|---|---|
| 2011/0058293 A1 | 3/2011 | Pardoen et al. |
| 2012/0274382 A1* | 11/2012 | Ucciardello ..... H03K 3/356113 327/333 |
| 2013/0063100 A1 | 3/2013 | Henzler |
| 2014/0266116 A1 | 9/2014 | Henzler et al. |
| 2014/0307354 A1 | 10/2014 | Watanabe |

* cited by examiner

MULTI-LEVEL OUTPUT CIRCUIT HAVING CENTRALIZED ESD PROTECTION

FIELD OF INVENTION

The field of invention pertains generally to the electronic arts, and, more specifically, to a multi-level output circuit having centralized ESD protection.

BACKGROUND

Semiconductor chips and their associated circuitry interface to the outside world primarily through I/O circuits (input and/or output circuits). A problem can arise if a large electro-static or "ESD" voltage strike that is generated external to the chip makes contact with an I/O circuit. Here, the large ESD voltage can damage the I/O circuit and perhaps deeper circuitry behind the I/O circuitry if adequate protection circuits are not built into the I/O circuits themselves.

FIGURES

A better understanding of the present invention can be obtained from the following detailed description in conjunction with the following drawings, in which.

Figures 6A, 6B, 6C:
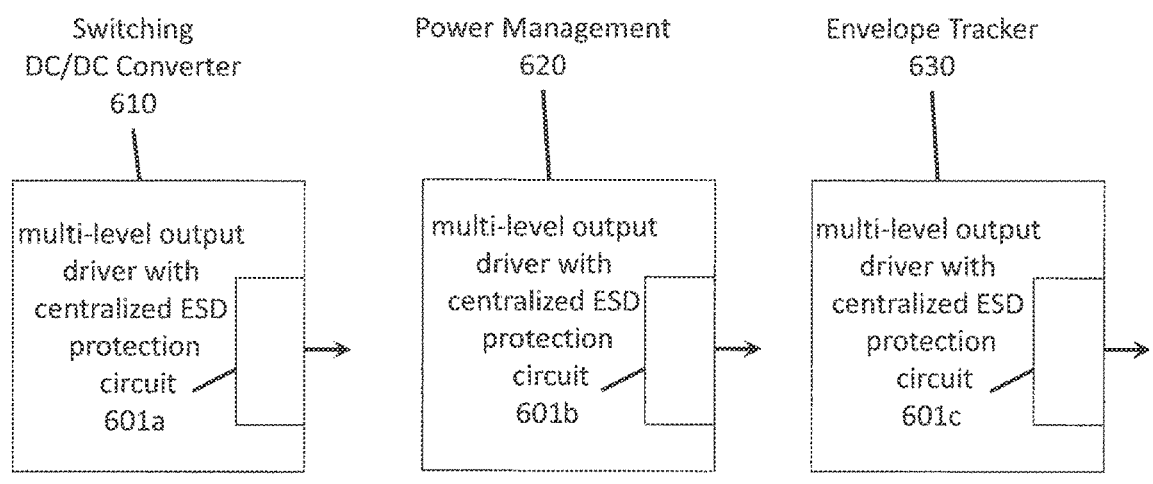
Figure 7:
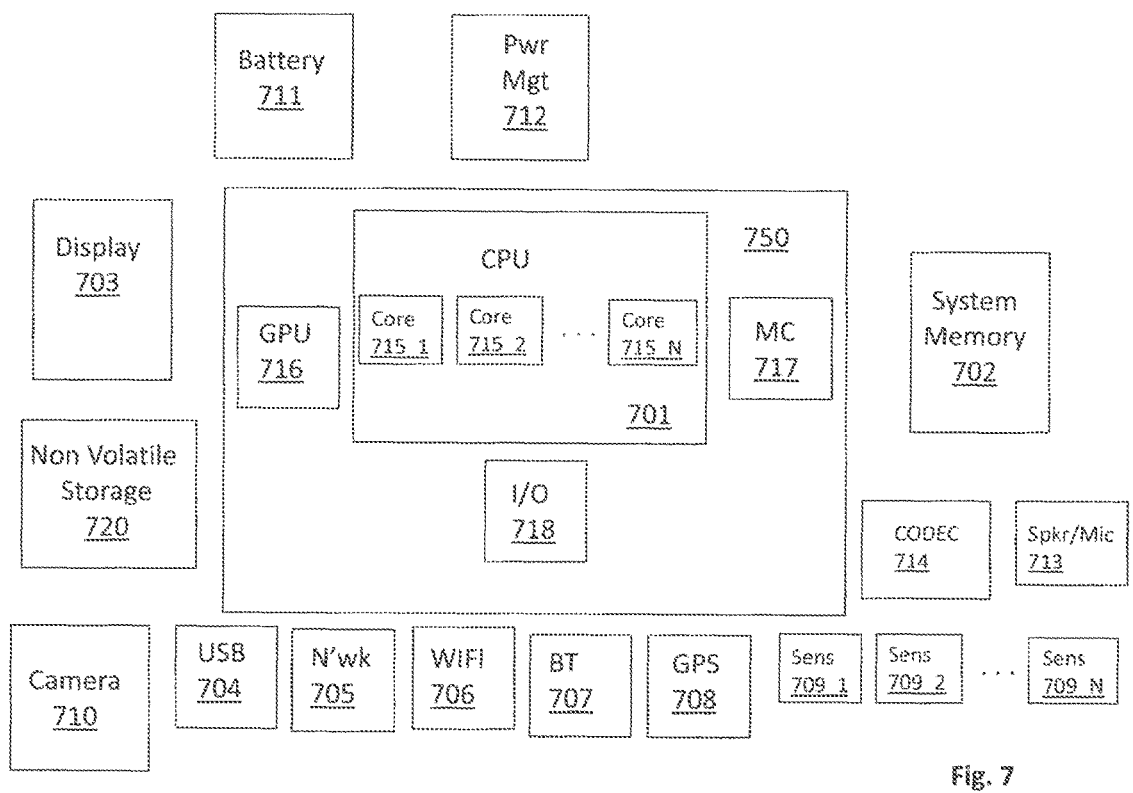

FIGS. 6a-c show an embodiment of a computing system;

FIG. 7 shows a computing system.

DETAILED DESCRIPTION

Figure 1:
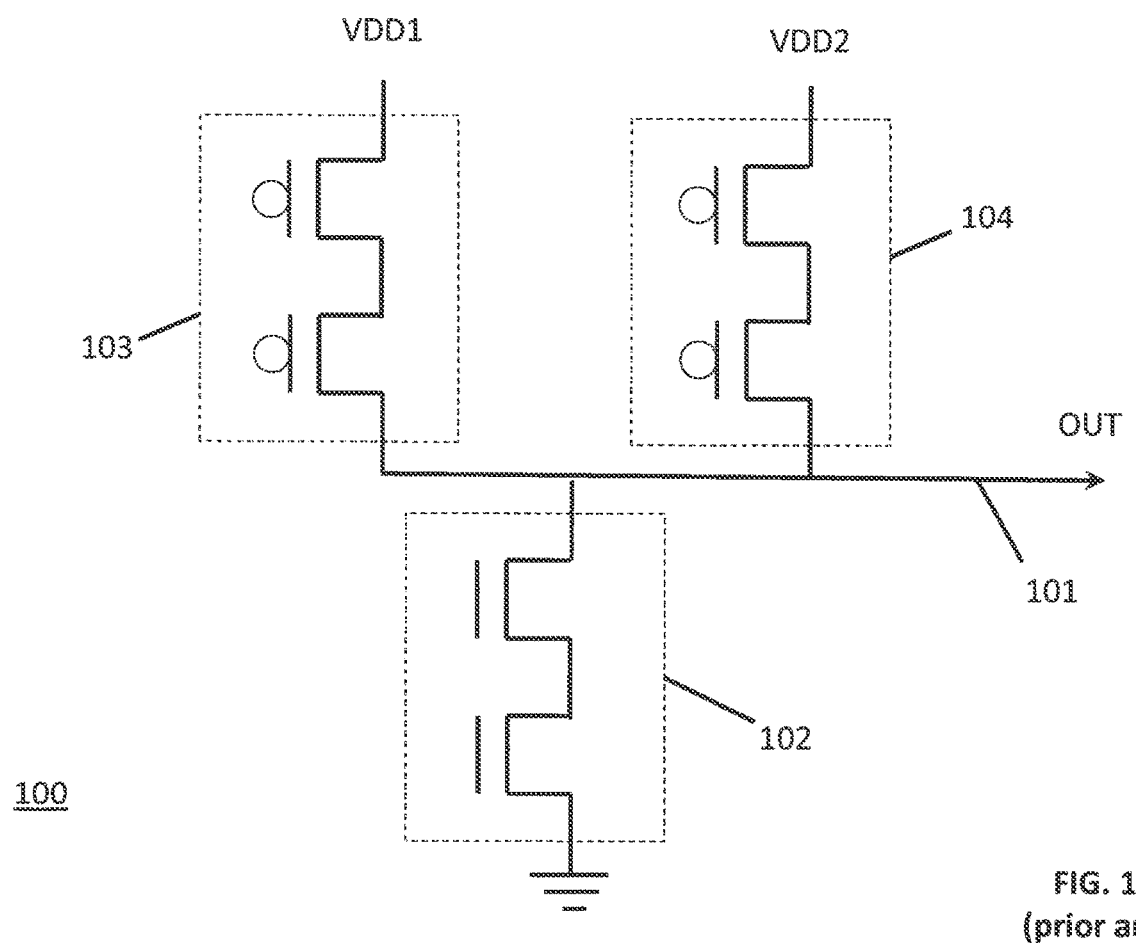
FIG. 1 shows an I/O circuit that can provide two different voltage levels at an output node (prior art)

FIG. 1 shows an output driver circuit 100 that is coupled to two different power domains VDD1, VDD2 to drive two different logic high or supply voltage levels at an output node 101. The output node is pulled down to, e.g., a logic low level or a reference voltage when the lower N type transistors 102 are "on" and both upper sets of P type transistors 103, 104 are "off". To raise the voltage at the output node 101 to a logic high level or a supply voltage at a first voltage VDD1, P type transistors 103 are "on", P type transistors 104 are "off" and N type transistors 102 are "off". Likewise, to raise the voltage at the output node 101 to a logic high level or a supply voltage at a second voltage VDD2, P type transistors 103 are "off", P type transistors 104 are "on" and N type transistors are "off" 102.

Figure 2:
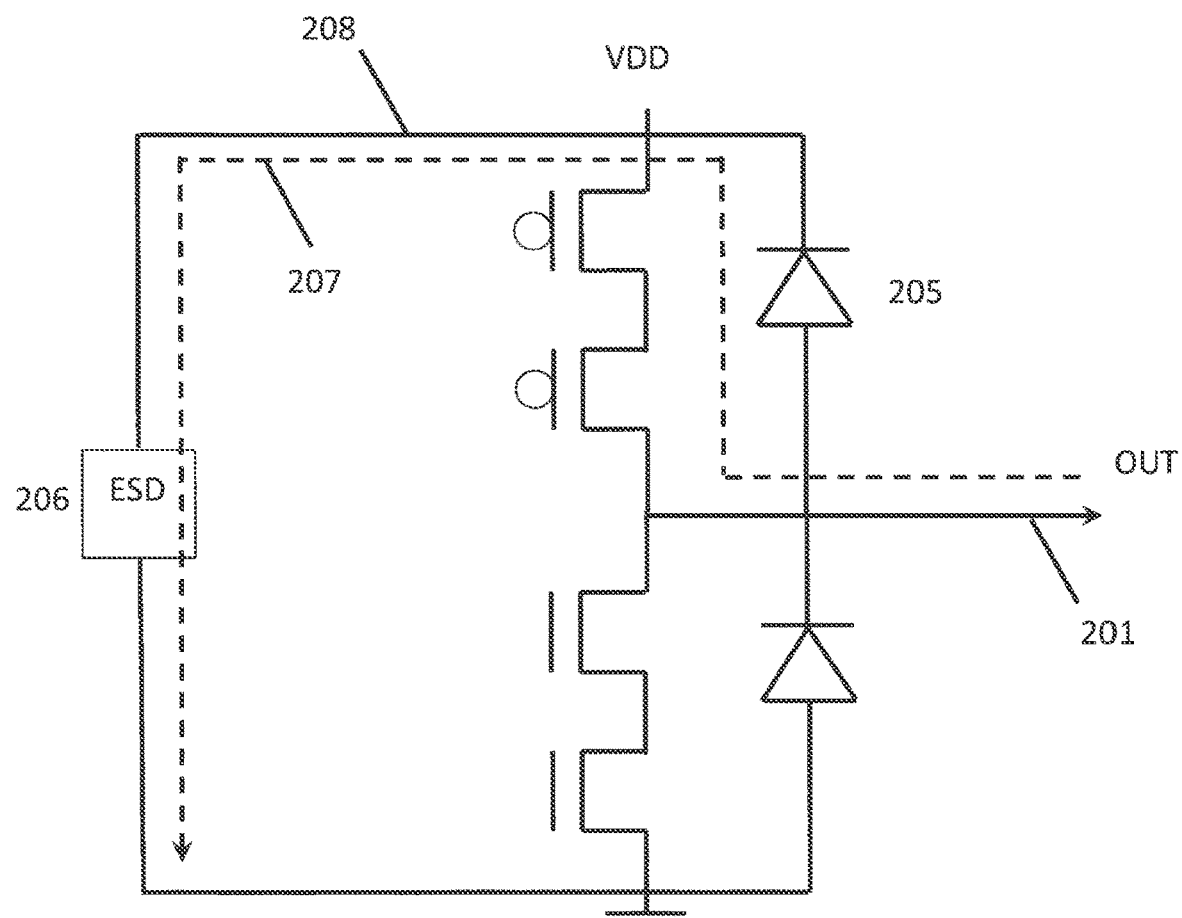
FIG. 2 shows a depiction of a traditional ESD protection circuit.

FIG. 2 shows an output driver with a single power domain having traditional ESD protection. Here, the output node 201 may be coupled to, e.g., an I/O pad, ball, lead or pin that may receive a large ESD voltage that is generated "off chip". If the output node 201 receives a large positive voltage, protection diode 205 and ESD protection clamp 206 act to protect the output driver and other circuitry on the chip by providing a current path 207 to ground, while, at the same time, clamping the voltage on the VDD power rail 208 to a voltage that will not damage the output driver or the other circuitry.

Specifically, current from the externally generated voltage will flow 207 through the protection diode 205 and then through the ESD protection clamp 206. The protection diode 205 substantially prevents any damaging current from flowing through the driver. The ESD protection clamp 206 not only substantially prevents any damaging current from flowing through the driver but also clamps the voltage on the VDD power rail 208 to a voltage that does not damage the driver circuit. Here, the ESD protection clamp 206 will exhibit a clamping voltage across it when it discharges current from an ESD strike. An ESD protection clamp can be designed in a way to prevent current flow until some threshold is reached at which point, upon its conduction of current, the voltage drop across it will be approximately fixed at some voltage level. ESD protection clamps can also be designed in a way such that they prevent current flow until they detect a transient behavior of a node, e.g. the node where the ESD discharge is applied to and then start conducting. Here, the protection diode 205 is specially constructed to withstand a large voltage difference that may temporarily exist between the externally generated voltage on the output node 201 and the voltage that the VDD power rail 208 is clamped to.

Figure 3:
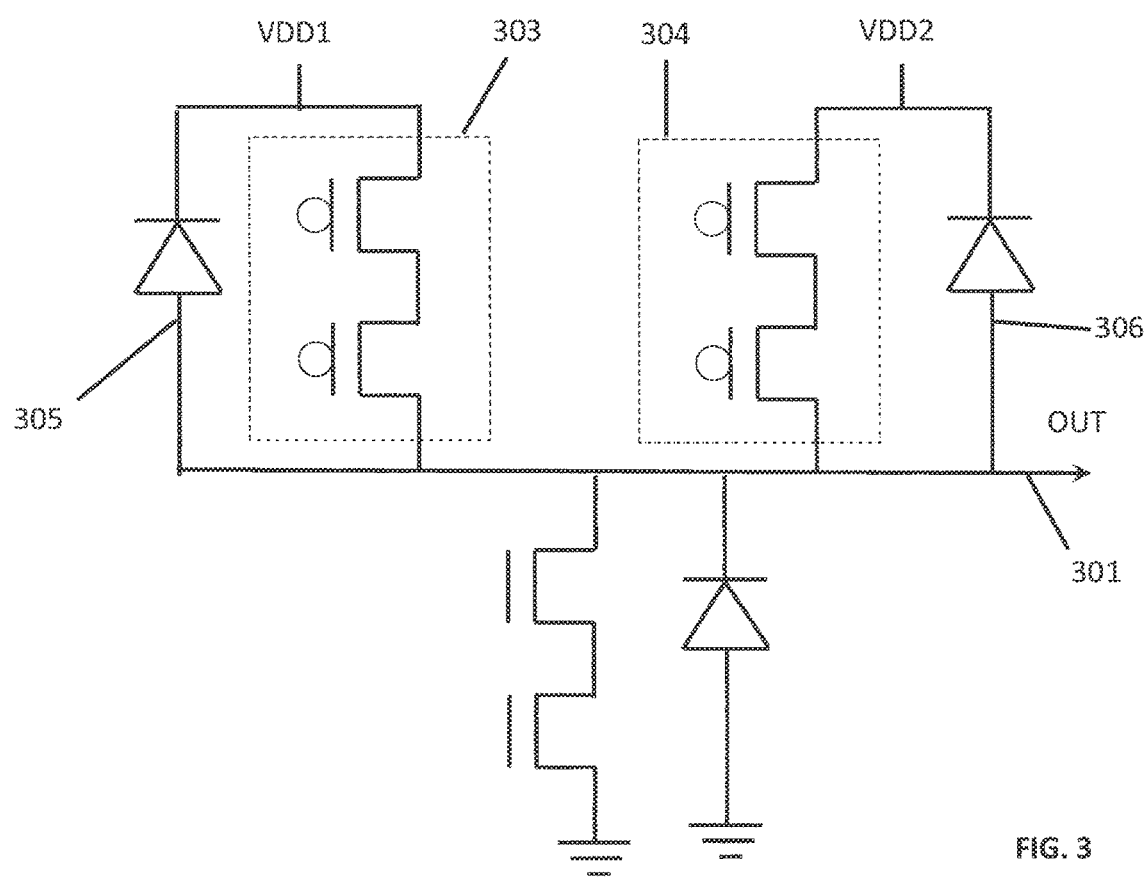
FIG. 3 shows a problem that can arise if traditional ESD protection is used with the circuit of FIG. 1.

FIG. 3 shows a problem that can exist if the traditional ESD protection scheme of FIG. 2 is applied to the dual output voltage driver circuit of FIG. 1. As observed in FIG. 3, protection diodes 305, 306 are respectively shunted across both sets of the driver's P type transistors 303, 304. A problem can arise during normal operation of the device (where no externally generated ESD voltage is present) if the driver is configured to drive the larger supply voltage level at the output node 301.

Here, if VDD2 is larger than VDD1, when P type transistors 304 are "on" and P type transistors 303 are "off", the larger VDD2 voltage will be present at the output node 301. Unfortunately, protection diode 305 will turn "on" in this case because the larger VDD2 voltage has the effect of providing a forward bias to the protection diode 305 whose cathode is coupled to the lower VDD1 voltage. The turning "on" of protection diode 305 will effectively clamp the output node 301 to a voltage level that corresponds to VDD1 plus the forward voltage of the protection diode 305. In systems where VDD2 is greater than VDD1 by more than the forward voltage of the protection diode 305, an improper output voltage will be provided at output node 301.

Figure 4:
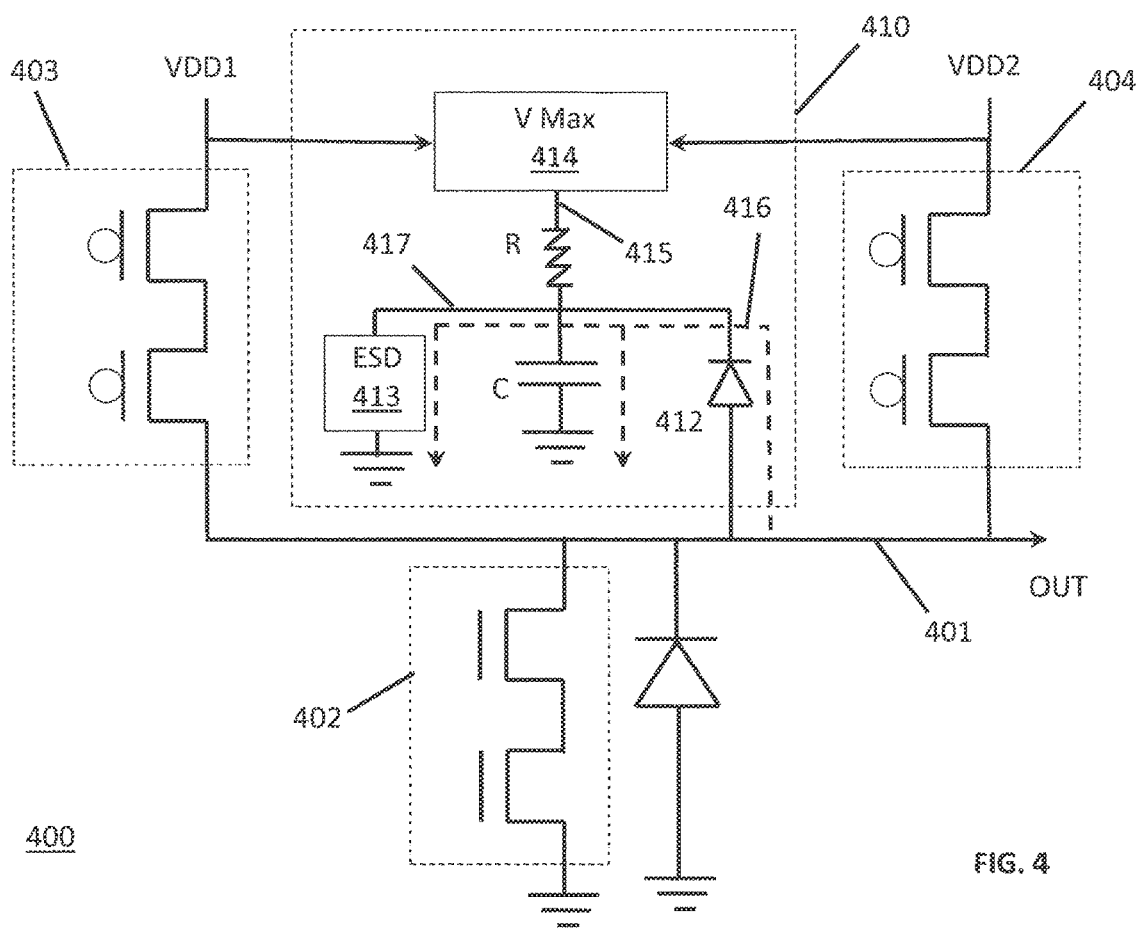
FIG. 4 shows the circuit of FIG. 1 with a functional ESD protection circuit.

FIG. 4 shows an output driver design 400 that solves the problem of FIG. 3. Like the drivers of FIGS. 1 and 3, the driver 400 of FIG. 4 is configured to drive one of two different voltage levels on the output node. ESD protection, however, is provided through a centralized protection circuit 410 that includes a protection diode 412 and ESD protection clamp 413 that protects both sets of P type transistors 403, 404. Additionally, the centralized protection circuit 410 includes a maximum voltage selection circuit 414 that provides the larger of supply voltages VDD1 and VDD2 on node 415. As such, the larger of the two supply voltages can be either VDD1 or VDD2—the circuit is indifferent as to which one is greater.

If a large external ESD voltage strike is generated at the output node 401, current will flow along path 416 through the protection diode 412 and then from node 417 into the capacitance C and the ESD protection clamp 413 to ground. Here, with the capacitor C essentially behaving as a short circuit for the inrush of current and the ESD protection clamp 413 clamping the voltage on node 417 to its clamping voltage, the presence of resistance R at node 417 thwarts substantial current flow deeper into the maximum voltage selection circuit 414. Here, resistance R and capacitance C act as a low pass filter in front of the maximum voltage selection circuit 414 that prevents any sudden voltage change at node 415.

During normal operation, as indicated just above, node 415 is set to the larger of VDD1 and VDD2. Consider an example where VDD2 is the larger of the two supply voltages. In this case, node 415 is set at VDD2.

If the driver is configured to drive an output signal at the higher VDD2 voltage level, a voltage of VDD2 will be present at the output node 401 when the driver 400 is driving the VDD2 voltage level at the output node 401 (N type transistors 402 are "off", P type transistors 403 are "off" and P type transistors 404 are "on"). In this case, the centralized protection circuit 410 is electrically isolated from the output node 401 because the protection diode 412 is not forward biased (worst case, it has the same VDD2 voltage at both its anode and cathode and therefore has no significant voltage drop across it).

If a ground level (e.g., a logic low) is being driven at the output node 401, both sets of P type transistors 403, 404 are "off" and the N type transistors 402 are "on". In this case, the centralized protection circuit 410 again does not influence the voltage level at the output node 401 because the protection diode 412 is reverse biased.

If the driver is configured to drive at the lower, VDD1 voltage level, a voltage of VDD1 will be present at the output node 401 when the driver is driving a VDD1 voltage level at the output node 401 (N type transistors 402 are "off", P type transistors 404 are "off" and P type transistors 403 are "on"). In this case, the centralized protection circuit 410 is again isolated from the output node because the protection diode 412 is again reverse biased (it has the larger VDD2 voltage at its cathode on node 417 and the smaller VDD1 voltage at its anode on output node 401).

If a ground level (e.g., a logic low) is being driven at the output node 401, both sets of P type transistors 403, 404 are "off" and the N type transistors 402 are "on". In this case, the centralized protection circuit 410 again does not influence the voltage level at the output node 401 because the protection diode 412 is reverse biased.

The above description of FIG. 4 is also accurate for cases where VDD1 is greater than VDD2 provided the description's references to "VDD1" and "VDD2" are swapped.

It is important to recognize that the circuit of FIG. 4 is tailored to addressing the problems with the particular prior art circuit of FIG. 3. Various types of circuits may be designed to selectively couple more than one supply voltage rail to an output node, whereas other types of circuits may be designed to selectively couple more than one logic high voltage level to an output node. As such, the teachings described herein should not be construed as being limited to circuits having the inverter driver structures 402, 403 and 404 nor the specific ESD protection circuit 410 of FIG. 4. As stated just above, the solution presented in FIG. 4 can be applied more generally to various kinds of circuitry.

More generally, the problem of un-desirably turning on a protection diode that is coupled to a lower supply voltage when the output node is to brought to a higher supply voltage, is solved with a "centralized" ESD protection circuit (e.g., circuit 410 of FIG. 4) that includes a maximum supply voltage select circuit having an output that is coupled to an internal node (e.g., node 417 of the specific embodiment of FIG. 4) that resides within the centralized ESD protection circuit. The centralized ESD protection circuit further includes first protection circuitry (e.g., diode 412 in the embodiment of FIG. 4) that is coupled from the output node to the internal node, and, second protection circuitry (e.g., ESD clamp 413 in the embodiment of FIG. 4) that is coupled to the internal node to sink ESD current that is received at the internal node through the first protection circuitry. The second protection circuitry may or may not be coupled to ground, depending on implementation (e.g., it may be coupled to a negative supply rail).

Even more generally, the problem of un-desirably turning on a protection diode that is coupled to a lower supply voltage when the output node is brought to a higher supply voltage is achieved with a centralized ESD protection circuit (e.g., circuit 410 of FIG. 4) that includes a circuit (e.g., the maximum voltage select circuit 414 of FIG. 4) that is designed to bias an internal node of the centralized ESD protection circuit to ensure that a first protection circuit (e.g., protection diode 412) does not conductor current or otherwise maintains isolation of the output node from the ESD protection circuitry during normal operation. As demonstrated in the particular embodiment of FIG. 4, one way of designing the ESD protection circuit is to chose/select the highest voltage and tie the internal node towards the supply node.

Here, it is pertinent to recognize that circuits other than the maximum selection of multiple supply voltages that may be presented on the output (as is implemented with circuit 414 in the specific embodiment of FIG. 4) may be implemented. For instance, a first alternate embodiment may simply bias the internal node with a DC voltage that is not capable of being provided at the output node or is not even a supply voltage. Further still, the internal node may be biased with a logic signal generated by logic circuitry (e.g., the internal node is bias with a logic high signal or, e.g., a dynamic signal that is run through a low pass filter). Thus, the advantage/effect of biasing is to decouple the internal node from the output node and thus to ensure that the first protection circuitry does not substantially conduct current when one of the multiple supply voltages is present at the output node. As such it is pertinent to recognize that there exist multiple ways to appropriately bias the internal node other than selecting a maximum of one of the supply voltages that may be presented at the output.

It also pertinent to recognize that whereas some embodiments may be entirely monolithic (integrated completely on a single semiconductor die), other embodiments may be composed of one or more discrete components disposed, e.g., on a printed circuit board. As such, the first and/or second protection circuits may be implemented with any of a number of different types of ESD protection devices and/or circuits.

An ESD protection device should generally demonstrate a fast response time (to react quickly to a sudden ESD strike), a high current capacity (in order to handle the potentially large amount of charge associated with an ESD current strike) and a limited voltage drop as a function of the current that flows through the device (e.g., to limit internal voltages during an ESD strike). As such the first and second protection circuits may be implemented as any of a diode (zener or otherwise), varistor (non linear variable resistance), transient voltage suppressor, ceramic ESD device, thyristor, a clamping device or circuit (e.g., one or more transistors designed to pass large amounts of current with a limited voltage drop, etc.), an RC triggered MOS transistor, etc.

Figure 5:
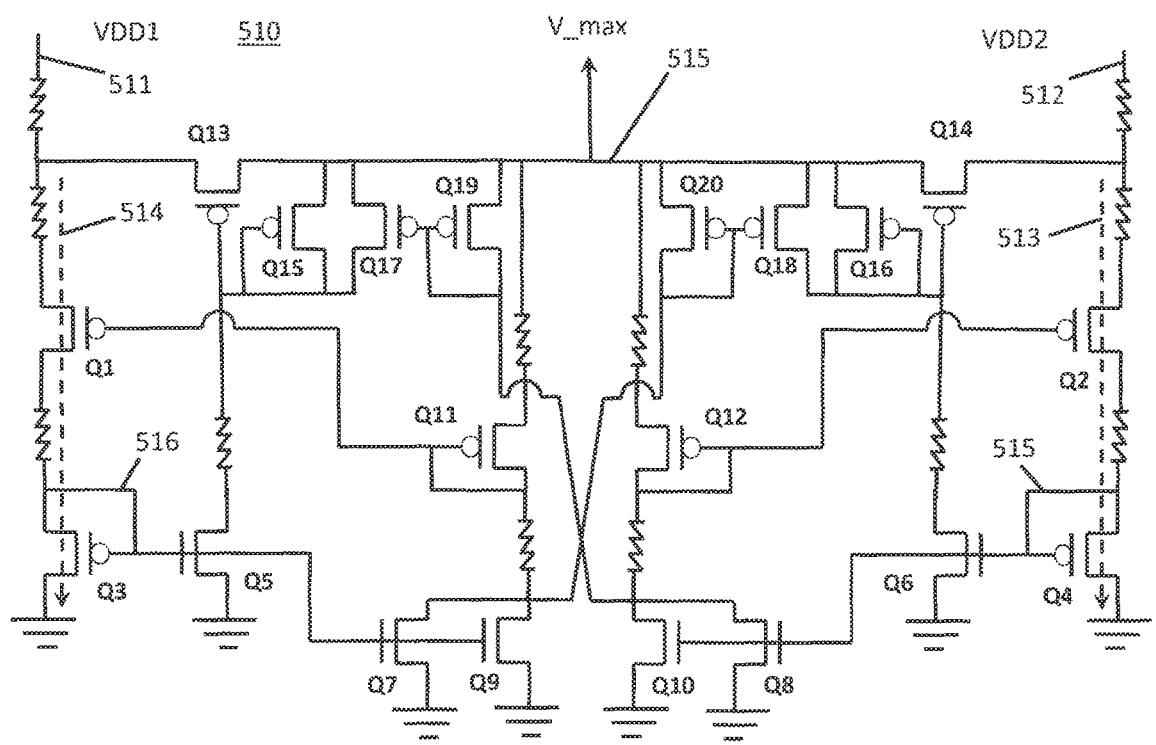
FIG. 5 shows an embodiment of a maximum voltage selector circuit.

FIG. 5 shows an embodiment 510 of the maximum voltage selection circuit 410 of FIG. 4. As observed in FIG. 5, the circuit 510 receives VDD1 and VDD2 at respective inputs 511, 512. The maximum of the two input voltages is presented at output node 515. Considering an example where VDD2 is greater than VDD1, more current will flow along current path 513 than along current path 514. As a consequence, the voltage on node 515 will be larger than the voltage on node 516. This causes transistors Q6, Q8 and Q10 to respectively pull more current than transistors Q5, Q7 and Q9.

As a consequence of transistor Q6 pulling more current than transistor Q5, the voltage at the gate of transistor Q14 will be lower than the voltage at the gate of transistor Q13. This drives transistor Q14 to be more "on" than transistor Q13.

Additionally, with transistor Q8 pulling more current than transistor Q7, the gate voltage of transistor Q17 will be lower than the gate voltage of transistor Q18. This causes transistor Q17 to behave more like a short circuit than transistor Q18 which will have the effect of raising the gate voltage on transistor Q13 (the gate node of transistor Q13 is pulled "up" closer to the voltage on the output node 515). By contrast, a larger voltage drop is permitted to exist across transistor Q18 which permits keeping the gate voltage on transistor Q14 at a low voltage.

Additionally, with transistor Q10 pulling more current than transistor Q9, the gate voltage on transistor Q2 will be lower than the gate voltage on transistor Q1, which, in turn, drives even more current along path 513 than along path 514. As a consequence, the voltage on node 515 will be raised even further above the voltage on node 516 causing transistor Q6 to drive the gate voltage of transistor Q14 even more below the gate voltage of transistor Q13, which turns transistor Q14 even more "on" than transistor Q13.

Thus the "loop" of continually raising the voltage on node 515 thereby causing the gate voltage on transistor Q14 to drop and the gate voltage on transistor Q13 to rise continues until transistor Q14 is fully "on" and transistor Q13 is "off" thereby setting the output node at the VDD2 voltage.

If VDD1 were to be greater than VDD2, a voltage of VDD1 would appear at the output node 515 according to the same principles described just above but with the voltage on node 516 being of greater than the voltage on node 515 so as to turn transistor Q13 "on" and turn transistor Q14 "off". The circuit of FIG. 5 is able to handle many different kinds of combinations of VDD1 and VDD1 within a range of 0≤VDD1<VDD2 or 0≤VDD2<VDD1 (e.g., VDD1=0.5V and VDD2=0.0V; VDD1=0.0V and VDD2=0.5V).

Although various embodiments above have stressed a dual-level output driver where two different supply rail or logic high voltage levels can be provided at an output node, it is pertinent to recognize that the teachings provided herein can be extended to circuits that drive more than two supply rail or logic high voltage levels at a single output node. Thus, more generally, the teachings herein pertain to circuits that include multiple supply voltage nodes and are capable of providing any one of the multiple supply voltages from the multiple supply voltage nodes at the output node. In the embodiment of FIG. 4 the multiple supply voltage nodes are the VDD1 and VDD2 nodes. Again, other embodiments having more than two supply voltage nodes can be realized.

For example, more than two sets of P type drivers may be coupled to output node 401—each with its own respective supply voltage. Likewise, the maximum voltage selection circuit 510 can be "scaled" in a manner consistent with the design of FIG. 5. Here, referring to FIG. 5 notice that the circuit can be viewed as having a left "VDD1" input circuit half composed of a set of ten transistors (Q1, Q3, Q5, Q7, Q9, Q11, Q13, Q15, Q17 and Q19) and a right "VDD2" input half composed of a set of ten transistors (Q2, Q4, Q6, Q8, Q10, Q12, Q14, Q16, Q18, Q20). The circuit of FIG. 5 can be scaled to include another set of transistors for each next input supply but with, e.g., additional Q7/Q8 and Q19/Q20 transistors to handle the extra cross coupling between the different input supply voltage circuit sets.

Is still yet other embodiments, more than one output node may share a same centralized protection circuit. For example in the embodiment of FIG. 4, the centralized protection circuit 410 may be coupled to multiple output nodes each having its own respective set of P type pull-up driver instances 403, 404 and its own N type pull-down driver instance 402. A separate protection diode 412 would be respectively coupled to each output node to preserve electrical isolation between the different output nodes.

FIGS. 6a through 6c shows various types of circuits 610, 620, 630 that may include multi-level I/O output driver circuits 601a, 601b, 601c that can provide more than one output supply or logic-high voltage level and that have centralized ESD protection circuitry as described herein. As observed in FIG. 6a, a switched power supply circuit 610 (e.g., a buck converter) may include a multi-level output driver 601a. As observed in FIG. 6b, a power management circuit 620 (e.g., a circuit that changes an output supply voltage based on a detected system condition) may include a multi-level output driver 601b. As observed in FIG. 6c, an envelope tracker circuit 630 that "steps" an output voltage to track an input waveform may include a multi-level output driver 601c.

Although embodiments above have stressed positive supply voltages and logic high voltage levels it is conceivable that the principles discussed herein could be applied to an "inverted" form of the above described circuitry that seeks to provide multiple negative voltage levels at a same output node. In this case, the P type transistors 403 and 404 of FIG. 4 would be replaced by N type transistors, the N type transistors 401 would be replaced by P type transistors and VDD1 and VDD2 would correspond to negative supply voltages. Here, the maximum voltage selection circuit 414 would be implemented as an absolute maximum voltage selection circuit that would select the most negative of the different supply voltages. A maximum voltage selection circuit is understood to include an absolute maximum voltage selection circuit. Likewise, a "maximum" voltage is understood to include an "absolute maximum" voltage.

FIG. 7 shows an embodiment of a computing system 700 that may include a circuit that can drive multiple supply or logic-high voltage levels from a single output node as described at length above. The computing system 700 may be a personal computing system (e.g., desktop or laptop) or a mobile or handheld computing system such as a tablet device or smartphone, or, a larger computing system such as a server computing system.

As observed in FIG. 7, the basic computing system may include a central processing unit 701 (which may include, e.g., a plurality of general purpose processing cores and a main memory controller disposed on an applications processor or multi-core processor), system memory 702, a display 703 (e.g., touchscreen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_N (e.g., one or more of a gyroscope, an accelerometer, a magnetometer, a temperature sensor, a pressure sensor, a humidity sensor, etc.), a camera 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 517 (e.g., a memory controller) and an I/O control function 718. The general purpose processing cores 715 typically execute the operating system and application software of the computing system. The graphics processing units 716 typically execute graphics intensive functions to, e.g., generate graphics information that is presented on the display 703. The memory control function 717 interfaces with the system memory 702.

The system memory 702 may be a (e.g., byte addressable) multi-level system memory. Here, the performance of a computing system is often dependent on the performance of its system memory. As is understood in the art, program code "executes" out of system memory. If data or a portion of program code is not presently in system memory but is needed by executing code, the needed data or code is called up from storage 720 (e.g., a non volatile hard disk drive (HDD) or semiconductor storage device (SSD)). The transfer of information from storage to system memory may correspond to system inefficiency as traffic congestion within the system may increase and/or the system or a thread within the system may idle waiting for the information to be loaded in system memory.

As such, to prevent such inefficiency, a lower level of system memory may be implemented with an emerging non volatile memory technology (e.g., a phase change based memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc.) and a higher level of system memory may be implemented with a faster, volatile memory technology (e.g., DRAM). The faster, higher level of system may be implemented as a last level CPU cache, a memory side cache or as a faster region of system memory having its own unique addressing space.

The power management control unit 712 generally controls the power consumption of the system 700. Each of the touchscreen display 703, the communication interfaces 704-707, the GPS interface 708, the sensors 709, the camera 710, and the speaker/microphone codec 713, 714 all can be viewed as various forms of I/O (input and/or output) relative to the overall computing system including, where appropriate, an integrated peripheral device as well (e.g., the camera 710). Depending on implementation, various ones of these I/O components may be integrated on the applications processor/multi-core processor 750 or may be located off the die or outside the package of the applications processor/multi-core processor 750.

A semiconductor chip having an I/O circuit that can drive multiple supply or logic-high voltage levels from a single output node having centralized ESD protection as described at length above may exist, for example, at any of the following locations in the computing system 700 of FIG. 7: 1) a switching DC/DC converter that converts a first DC input voltage (e.g., from a battery or from a transformer coupled between the system and a wall outlet) to a second DC voltage used by the system; 2) within the power management unit 712; and/or, 3) a tracking circuit (e.g., at a networking interface or elsewhere) that discretely tracks an input waveform's voltage levels.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
an electronic circuit comprising:
a) multiple supply voltage nodes that are coupled to one another but not through a gate node of any transistor;
b) an output node;
c) an internal node;
d) first protection circuitry coupled between the internal node and the output node;
e) a control circuit coupled to the internal node to bias the internal node;
f) second protection circuitry coupled to the internal node.

2. The apparatus of claim 1 wherein the control circuit is connected to at least one of the multiple supply voltage node to bias the internal node towards one of the multiple supply voltages.

3. The apparatus of claim 1 wherein the control circuit includes at least one circuit device connected from the internal node to at least one of the multiple supply nodes to selectively switch the internal node to the respective one of the multiple supply nodes.

4. The apparatus of claim 1 wherein the second protection circuitry is coupled to ground.

5. The apparatus of claim 1 wherein more than one output node is coupled to the internal node via a respective first protection circuit.

6. The apparatus of claim 1 wherein the first protection circuitry and the second protection circuitry are to protect the electronic circuit from an ESD strike on the output node.

7. The apparatus of claim 3 further comprising one or more transistors between each of the multiple supply voltage nodes and the output node.

8. The apparatus of claim 1 further comprising a filter coupled to the voltage selector and/or to the internal node.

9. The apparatus of claim 5 wherein the filter is a low pass filter.

10. The apparatus of claim 1 wherein the first protection circuitry comprises a diode.

11. The apparatus of claim 1 wherein the second protection circuitry comprises any of:
a diode;
a varistor;
a transient voltage suppressor;
a thyristor;
a clamping device or circuit;
a ceramic ESD device;
an RC triggered MOS transistor.

12. The apparatus of claim 1 wherein the output of the electronic circuit is a supply voltage rail.

13. An apparatus, comprising:
an electronic circuit, comprising:
a) multiple supply voltage nodes;
b) an output node;
c) an internal node;

d) a selector circuit between the internal node and each of the multiple supply voltage nodes, the selector circuit to provide a greater one of the multiple supply voltages on the internal node;

d) first protection circuitry coupled between the internal node and the output node; and, e) second protection circuitry coupled to the internal node.

14. The apparatus of claim 13 wherein the electronic circuit is any one of:
a DC/DC converter circuit,
a power management circuit;
an envelope tracker circuit.

15. The apparatus of claim 13 wherein the second protection circuitry is coupled to ground.

16. The apparatus of claim 13 wherein more than one output node is coupled to the internal node via a respective first protection circuit.

17. The apparatus of claim 13 wherein the first protection circuitry comprises a diode.

18. The apparatus of claim 13 wherein the wherein the second protection circuitry comprises any of:
a diode;
a varistor;
a transient voltage suppressor;
a thyristor;
a clamping device or circuit;
a ceramic ESD device;
an RC triggered MOS transistor.

19. A computing system, comprising:
a plurality of processing cores;
a memory controller coupled to a system memory;
a communication interface communicatively coupled to the memory controller;
an electronic circuit comprising:
a) multiple supply voltage nodes that are coupled to one another but not through a gate node of any transistor;
b) an output node;
c) an internal node;
d) first protection circuitry coupled between the internal node and the output node;
e) a control circuit to coupled to the internal node to bias the internal node;
f) second protection circuitry coupled to the internal node.

20. The computing system of claim 19 wherein the electronic circuit is part of any of DC/DC converter circuit, power management circuit or envelope tracker circuit within the computing system.

21. The apparatus of claim 18 wherein the first protection circuitry comprises a diode.

22. The apparatus of claim 18 wherein the wherein the second protection circuitry comprises any of:
a diode;
a varistor;
a transient voltage suppressor;
a thyristor;
a clamping device or circuit;
a ceramic ESD device;
an RC triggered MOS transistor.

23. The apparatus of claim 18 wherein the second protection circuitry is coupled to ground.

* * * * *